United States Patent
Fan et al.

(10) Patent No.: US 12,467,013 B2
(45) Date of Patent: Nov. 11, 2025

(54) METHOD FOR EXTRACTING HIGH-QUALITY KRILL OIL FROM KRILL

(71) Applicant: LUHUA BIOMARINE (SHANDONG) CO., LTD., Jinan (CN)

(72) Inventors: Ningning Fan, Jinan (CN); Xuhai Gong, Jinan (CN); Jun Zong, Jinan (CN)

(73) Assignee: LUHUA BIOMARINE (SHANDONG) CO., LTD., Jinan (CN)

( * ) Notice: Subject to any disclaimer, the term of this patent is extended or adjusted under 35 U.S.C. 154(b) by 717 days.

(21) Appl. No.: 17/792,415

(22) PCT Filed: Jan. 11, 2021

(86) PCT No.: PCT/CN2021/071139
§ 371 (c)(1),
(2) Date: Jul. 13, 2022

(87) PCT Pub. No.: WO2021/143654
PCT Pub. Date: Jul. 22, 2021

(65) Prior Publication Data
US 2023/0070167 A1    Mar. 9, 2023

(30) Foreign Application Priority Data
Jan. 13, 2020    (CN) .......................... 202010033221.4

(51) Int. Cl.
| | | |
|---|---|---|
| C11B 3/06 | (2006.01) |
| A23D 9/02 | (2006.01) |
| A23L 17/00 | (2016.01) |
| A23L 33/115 | (2016.01) |
| A61K 31/20 | (2006.01) |
| B01D 3/10 | (2006.01) |
| C11B 1/10 | (2006.01) |

(52) U.S. Cl.
CPC ................. *C11B 3/06* (2013.01); *A23D 9/02* (2013.01); *A23L 17/00* (2016.08); *A23L 33/115* (2016.08); *A61K 31/20* (2013.01); *B01D 3/10* (2013.01); *C11B 1/10* (2013.01); *C11B 1/102* (2013.01); *A23V 2002/00* (2013.01)

(58) Field of Classification Search
CPC ... C11B 3/06; C11B 1/10; C11B 1/102; C11B 3/006; B01D 3/10
See application file for complete search history.

(56) References Cited

U.S. PATENT DOCUMENTS

2013/0012449 A1    1/2013    Katevas et al.

FOREIGN PATENT DOCUMENTS

| CN | 102405988 A | 4/2012 | |
|---|---|---|---|
| CN | 102766530 A | 11/2012 | |
| CN | 103602517 A | 2/2014 | |
| CN | 103981021 A * | 8/2014 | ............... C11B 1/10 |
| CN | 104327936 A * | 2/2015 | ............... C11B 1/00 |
| CN | 107779258 A * | 3/2018 | ............. B01D 11/02 |
| CN | 109181863 A | 1/2019 | |
| CN | 111187660 A | 5/2020 | |

OTHER PUBLICATIONS

Zhu Zihao, The refining of Antarctic Krill oil and the study on its capsule products, A dissertation for Master's Degree submitted to Zhejiang Ocean University 1-74 (Year: 2019).*
CN103981021A, Jiang Guoliang, A method for refining krill oil from Antarctic krill powder, English translation 10 pages (Year: 2014).*
CN107779258A, Li Chunpu et al., Preparation method of low arsenic content euphausliid oil. English translation 14 pages (Year: 2018).*
SC/T 3502-2016, Fish oil, The ministry of agriculture of the People's Republic of China, 2016, pp. 1-3.
Zhu Zihao, The Refining of Antarctic Krill Oil and the Study on its Capsule Products, A Dissertation for Master's Degree Submitted to Zhejiang Ocean University, 2019, pp. 1-74.
Chen Zhibin, et al., Oil Deacidification, Food Processing, 2012, pp. 310-313.

\* cited by examiner

Primary Examiner — Yate' K Cutliff
(74) Attorney, Agent, or Firm — Bayramoglu Law Offices LLC

(57) ABSTRACT

A method for extracting high-quality krill oil from krill includes the following steps: S1. performing extraction on krill with an organic solvent, and collecting an extracting solution; S2. adding alkaline water to the extracting solution to enable a free fatty acid to form a fatty acid salt to be separated from an oil phase, and performing oil-water phase separation and collecting the oil phase; and S3. purifying the oil phase to obtain the high-quality krill oil. In the present application, the preparation process for krill oil is optimized, organic solvent extraction and alkali refining are ingeniously combined, and process parameters are adjusted and optimized, thereby reducing the acid value of krill oil, and also ensuring the content of active ingredients such as phospholipid and astaxanthin in krill oil to the greatest extent, and improving the quality of krill oil.

15 Claims, No Drawings

METHOD FOR EXTRACTING HIGH-QUALITY KRILL OIL FROM KRILL

CROSS REFERENCE TO THE RELATED APPLICATIONS

This application is the national phase entry of International Application No. PCT/CN2021/071139, filed on Jan. 11, 2021, which is based upon and claims priority to Chinese Patent Application No. 202010033221.4, filed on Jan. 13, 2020, the entire contents of which are incorporated herein by reference.

TECHNICAL FIELD

The disclosure relates to the field of krill oil preparation, in particular to a method for extracting high-quality krill oil from krill.

BACKGROUND

Antarctic krill belongs to crustacean, about 85 species of krills exist in the global ocean, and about 7 to 8 species of krills are distributed around the Antarctic area in the south of the south latitude of 50 degrees, and are named as Antarctic krills. The Antarctic krill has a body length of 5.5-6.0 cm, a service life of 5-7 years, and a weight of about 2 g, is transparent in the body, and has high reproductive capacity. In the Antarctic area, the biomass of the Antarctic krill is about 342-536 million tons, and the Antarctic krill is a biological resource with a maximum global single species reserve. The Antarctic krill is rich in nutrition, including proteins, lipids and antioxidant substances, such as astaxanthin, flavonoids, vitamins A and E and the like.

Lipid components in Antarctic krill oil mainly include phospholipid, glyceride, free fatty acid, sterol and the like, wherein the phospholipid is rich in content, and is very close to that in human cells, so that the Antarctic krill oil is easily absorbed and utilized by a human body. Omega-3 polyunsaturated fatty acid in the Antarctic krill oil exists in the form of phospholipid, can prevent six diseases such as cardiovascular and cerebrovascular diseases, inflammatory reaction diseases, cancers, senile dementia, diabetes and hypopsia, has an activity superior to that of triglyceride type EPA/DHA products and terrestrial plant-derived lecithin products (the fatty acid composition does not contain EPA and DHA) in the current market, and is a novel marine organism functional component with a great development potential.

FFA (free fatty acid) is one of important factors influencing the quality of the Antarctic krill oil, the FFA in oil, especially polyunsaturated fatty acid, is easily oxidized to generate peroxide, and the peroxide is decomposed into low-molecular-weight volatile components such as aldehyde and ketone, so that not only is odor generated, but also the edible safety of the krill oil is influenced. Therefore, removal of the free fatty acid in the Antarctic krill oil is one of key processes for producing high-quality krill oil. A patent application CN103602517A discloses a method for extracting krill oil with low acid value, low protein content and low salt content from krill, the acid value (AV) of the obtained krill oil is 4.9-11.4 mgKOH/g, and the acid value is still unfavorable for long-term storage of the krill oil, which will affect the viscosity and transparency of the krill oil. The krill oil is rich in unsaturated fatty acid and is similar to fish oil, according to the fish oil standard SC/T 3502-2016, the acid value of refined first-grade fish oil is smaller than or equal to 1 mgKOH/g, the acid value of refined second-grade fish oil is smaller than or equal to 3 mgKOH/g, the acid value of fresh pure oil prepared from normal raw materials is very low and does not exceed 2-3 mgKOH/g, and the acid value of edible oil is not higher than 3 mgKOH/g. There are many methods for removing free fatty acids in oil, such as an alkali refining method, a distillation method, a solvent extraction method, an esterification method, biological deacidification, supercritical deacidification and the like, and the alkali refining method is most widely applied in industrial production; however, alkaline substances can cause saponification of local neutral oil and polar phospholipids, and meanwhile, it is extremely easy for soapstock formed by saponification of free fatty acids to adsorb phospholipids, so that loss of effective components is caused.

SUMMARY

Aiming at the defects in the prior art, the disclosure aims to provide a method for extracting high-quality krill oil from krill, and in the method, the preparation process for the krill oil is optimized, organic solvent extraction and alkali refining are ingeniously combined, and process parameters are adjusted and optimized, thereby reducing the acid value of krill oil, and also ensuring the content of active ingredients such as phospholipid and astaxanthin in the krill oil to the greatest extent, and improving the quality of the krill oil.

In order to achieve the purpose, the technical solution adopted by the disclosure is as follows:

the disclosure provides a method for extracting high-quality krill oil from krill, including the following steps:

S1, performing extraction on krill with an organic solvent, and collecting an extracting solution; wherein a solvent in the extracting solution is the organic solvent, and a solute is krill oil; and the krill can be krill meal or blocky krill or whole krill;

S2, adding alkaline water to the extracting solution to enable a free fatty acid to form a fatty acid salt to be separated from an oil phase (such as a full stirring mode), and performing oil-water phase separation (such as a mode of standing for layering), and collecting the oil phase; and S3, purifying the oil phase to obtain the high-quality krill oil.

The high-quality krill oil varies according to the quality of krill raw materials, and under the same condition, the method has the advantages of low acid value, high phospholipid content and high astaxanthin content.

One preferred embodiment is as follows: in the step S1, the organic solvent is any one or a mixture of any two or more of ethanol, acetone, n-hexane, diethyl ether, chloroform and ethyl acetate; preferably, ethanol; and the concentration of the organic solvent is 80-100%, preferably 90-100%, and more preferably 95-100%.

One preferred embodiment is as follows: in the step S1, during extraction, a material-liquid ratio of the krill to the organic solvent is 1:(2-10), preferably 1:(3-9), and more preferably 1:(3-6);
- an extraction mode is soaking extraction or countercurrent extraction, preferably countercurrent extraction;
- the extraction is performed at 15-35° C., preferably 17-30° C., and more preferably 19-22° C.;
- the extraction is performed for 1-5 times, preferably 2-3 times; and
- the extraction of each time is performed for 0.3-12 h, preferably 0.5-7 h.

One preferred embodiment is as follows: in the step S2, before adding the alkaline water to the extracting solution, the method further includes a step of concentrating the extracting solution; preferably, a concentrating mode is first reduced pressure distillation;
- more preferably, the first reduced pressure distillation is performed at 50-65° C., more preferably 60° C.;
- more preferably, the first reduced pressure distillation is performed under a vacuum degree of −0.07 Mpa to −0.1 Mpa; and
- preferably, the concentration of a solid matter in the concentrated extracting solution is 10%-20%, more preferably 15%.

One preferred embodiment is as follows: in the step S2, the mass of the alkaline water added is 0.5-0.9 times, preferably 0.6-0.8 times and more preferably 0.7 times of the mass of the extracting solution in terms of water.

One preferred embodiment is as follows: in the step S2, a solute in the alkaline water is an alkaline compound, and the alkaline compound includes at least one of sodium carbonate, potassium carbonate, sodium bicarbonate, potassium bicarbonate, sodium hydroxide, potassium hydroxide and calcium hydroxide; preferably sodium carbonate or sodium hydroxide;
- the alkaline compound is sodium hydroxide, and the actual addition amount of the sodium hydroxide is 0.7-1.3 times of the theoretical addition amount of the sodium hydroxide, preferably 0.9-1.2 times, and more preferably 1-1.1 times; the theoretical addition amount of the sodium hydroxide is $M_{oil} \times AV \times 7.14 \times 10^{-4}$, wherein $M_{oil}$ is the mass of krill oil in the extracting solution, and AV is an acid value of krill oil in the extracting solution; and
- the alkaline compound is sodium carbonate, and the actual addition amount of the sodium carbonate is 0.3-1.7 times of the theoretical addition amount of the sodium hydroxide, preferably 0.5-1.5 times, and more preferably 1.5 times.

One preferred embodiment is as follows: in the step S2, a reaction is carried out at 25-65° C., preferably 40-60° C., more preferably 45-55° C., and more preferably 50° C.

One preferred embodiment is as follows: in the step S3, the purifying includes the steps of dissolving the oil phase in absolute ethyl alcohol, filtering and desolventizing;
- preferably, a desolventizing method is second reduced pressure distillation; more preferably, the temperature and vacuum degree of the second reduced pressure distillation are the same as those of the first reduced pressure distillation.

The disclosure also provides high-quality krill oil, which is prepared by any one of the above methods, and a dosage form of the high-quality krill oil is a capsule, microcapsule, tablet, powder or emulsion in water.

The disclosure also protects use of any one of the methods or the high-quality krill oil in the preparation of foods or medicines, wherein the foods include common foods, health foods, dietary supplements and special medical foods.

The disclosure has the following beneficial effects:
according to the method, the alkaline water is added to the krill oil extracting solution, while free fatty acid in the krill oil is removed, and the acid value is reduced, the content of active ingredients, namely phospholipid and astaxanthin, in the krill oil is guaranteed to the maximum extent, the obtained krill oil has the characteristics of high-quality krill oil, and the storage stability can be obviously improved. In addition, the method provided by the disclosure also has the advantages of simple preparation process operation and no need of additional deacidification equipment. The method provided by the disclosure is of great significance to industrial production of high-quality krill oil and related products thereof.

DETAILED DESCRIPTION

The experimental methods used in the following examples are conventional methods unless otherwise specified.

Materials, reagents and the like used in the following examples are commercially available unless otherwise specified.

In the following examples:
yield (oil extraction rate)=the mass of the obtained krill oil/the mass of the used krill meal×100%; and
an acid value is defined as the number of milligrams of KOH or NaOH required for neutralizing free fatty acid in 1 g of oil.

Example 1 Krill Oil Extraction Process without Adding Alkali and Optimization

A method for preparing krill oil from Antarctic krill meal includes the following steps:
S1, performing countercurrent extraction on Antarctic krill meal by using an organic solvent (ethanol) to obtain an extracting solution;
S2, carrying out reduced pressure distillation on the extracting solution obtained in the step S1 to obtain a concentrated solution;
S3, adding purified water into the concentrated solution in the step S2 for refining, fully and uniformly mixing, standing until layering, and collecting lower-layer crude oil;
S4, mixing the lower-layer crude oil in the step S3 with absolute ethyl alcohol, standing, filtering, and retaining a dissolved solution; and
S5, carrying out reduced pressure distillation on the dissolved solution in the step S4 for desolvation under heating to obtain purified and refined krill oil.

In the step S1, the quality, the extraction rate and the content of effective substances of the krill oil can be influenced by the water content in the krill meal and the ethanol concentration, when the water content in the krill meal is high, the concentration of an extraction solvent ethanol is diluted, with the reduction of the ethanol concentration, the extraction rate is reduced, the phospholipid content is increased, but the astaxanthin content and transparency are reduced, and the viscosity is increased, and when the ethanol concentration is lower than 90%, the krill oil is poor in quality, and the ethanol concentration is preferably 90%, 95% and 100%.

In the step S2, the reduced pressure distillation is carried out at 50-65° C., preferably 60° C. under a vacuum degree range of −0.07 Mpa to −0.1 Mpa; and the concentration of a solid matter in the concentrated solution is 10%-20%, preferably 15%.

In the step S3, an adding proportion of the purified water is 50-90% of the mass of the concentrated solution, the use amount of water in a process of adding water for physical sedimentation can affect the extraction rate and the quality of the krill oil, within the use amount range, the oil extraction rate is high, the phospholipid content in the obtained krill oil is high, and in order to guarantee the phospholipid content and the oil extraction rate at the same time, the water addition amount is preferably 70%; the standing time is 1-8 h, preferably 4 h; in the refining process of adding purified water, phospholipid which does not have hydrophilic activity or has denatured does not absorb water and settle in the process according to the hydrophilicity of phospholipid, and a part of impurities, free fatty acid, protein, polysaccharide, salt and the like can be removed; unsaturated fatty acids such as phospholipids DHA and EPA and effective components such as astaxanthin in the obtained crude krill oil are obviously improved, and the quality (fluidity and transparency) of the obtained krill oil is obviously improved.

In the step S4, the usage amount of the absolute ethyl alcohol is 1-5 times of the mass of the lower-layer crude oil. Within the usage amount range, the oil extraction rate is high, the phospholipid content in the obtained krill oil is high, and the production cost is lowest. Most preferably, the amount of the absolute ethyl alcohol is 3 times of the mass of the lower-layer crude oil.

In the step S5, the process parameters of the reduced pressure distillation are the same as those in the step S2; and the purified and refined krill oil contains active phospholipids (including 2-20% of ether phospholipids and 25-55% of non-ether phospholipids), choline (greater than or equal to 5%), triglyceride, polyunsaturated fatty acids such as omega-3 unsaturated fatty acids and omega-6 unsaturated fatty acids, saturated fatty acids, free fatty acids, vitamins, trace elements and the like. The refined and purified krill oil is pure and transparent, the content of phospholipid, astaxanthin and Omega-3 unsaturated fatty acid is high, the krill oil can be applied to common food, health food, dietary supplement, functional food and special medical food, and a dosage form can be a capsule, microcapsule, paste, tablet, powder or emulsion in water and the like.

1. Comparison of Extraction Effects of Different Material-Liquid Ratios and Extraction Temperatures Krill oil is prepared from Antarctic krill meal according to the steps S1-S5, wherein an organic solvent is a 95% ethanol solution, the extraction time is 40-41 min, the concentration of a solid matter in a concentrated solution is 15%, the amount of water added in the step S3 is 70% of the mass of the concentrated solution, the standing time is 4 h, the reduced pressure distillation is carried out at 60° C. under a vacuum degree range of −0.07 Mpa to −0.1 Mpa, different material-liquid ratios (a mass ratio of the krill meal to the organic solvent) and different extraction temperatures are set, and the extraction effects of the finally obtained krill oil are compared, as shown in Table 1.

Through comparison of the results of numbers 1-1, 1-4, 1-5 and 1-6 in Table 1, it can be seen that the oil extraction rate is increased along with the increase of the material-liquid ratio, the phospholipid content in the krill oil is reduced along with the increase of the material-liquid ratio, and the astaxanthin content in the krill oil is increased along with the increase of the material-liquid ratio; the oil extraction rate difference between the material-liquid ratio of 1:6 and the material-liquid ratio of 1:9 is not large, showing that when the material-liquid ratio is 1:6, most fat in the krill meal is extracted, and when the material-liquid ratio is increased to 1:9, the production cost and the ethanol recovery pressure are greatly increased, so that the material-liquid ratio of 1:6 is adopted by comprehensively considering phospholipid, astaxanthin, the extraction rate and the production cost; and through comparison of the results of numbers 1-1, 1-2 and 1-3, it can be seen that when the extraction temperature is 20° C., the oil extraction rate, the phospholipid content and the astaxanthin content are relatively high and stability is high, and overall, when the extraction temperature is 20° C., the overall effect is good.

TABLE 1

Effect comparison of different material-liquid ratios and extraction temperatures

| No. | Material-liquid ratio | Extraction time/min | Extraction temperature/° C. | Oil extraction rate (%) | Phospholipid (g/100 g) | Astaxanthin (mg/kg) |
| --- | --- | --- | --- | --- | --- | --- |
| 1-1 | 1:4 | 41 | 21 | 9.50 | 68.26 | 249.98 |
| 1-2 | 1:4 | 41 | 24 | 11.80 | 61.46 | 226.29 |
| 1-3 | 1:4 | 41 | 26 | 8.00 | 68.16 | 242.54 |
| 1-4 | 1:5 | 40 | 21 | 11.05 | 60.59 | 276.83 |
| 1-5 | 1:6 | 40 | 20 | 11.51 | 62.26 | 287.19 |
| 1-6 | 1:9 | 40 | 20 | 12.19 | 60.63 | 294.37 |

2. Comparison of Extraction Effects of Different Organic Solvent Concentrations and Different Water Contents of Raw Materials (1) Extraction is carried out by using Antarctic krill meal as a raw material according to the method in the step 1 except that a material-liquid ratio is 1:3, extraction is carried out twice, extraction of each time is carried out for 1 h at room temperature (20-30° C.), the crude oil obtained in the step S3 is directly desolventized and evaporated to dryness, and an organic solvent is an ethanol solution of different concentrations, and the extraction effects of the finally obtained krill oil are compared, as shown in Table 2.

(2) Extraction is carried out by using Antarctic krill meal with different water contents as a raw material according to the method in the step 1 except that an organic solvent is absolute ethyl alcohol, and the extraction effects of the finally obtained krill oil are compared, as shown in Table 3.

Results in Table 2 show that the higher the ethanol concentration in the organic solvent is, the higher the oil extraction rate is, the lower the phospholipid content in the krill oil is, and the higher the astaxanthin content is, in addition, compared with the results in Table 1, the results in Table 2 show that the oil extraction rate is obviously improved, the material-liquid ratio is lower than that in Table 1, but the phospholipid content and the astaxanthin content are lower than those in Table 1, which indicates that the crude oil obtained in the step S3 is directly desolventized and evaporated to dryness, a large amount of impurities in the crude oil are not removed, so that the phospholipid content and the astaxanthin content are obviously reduced. The results in Table 3 show that the higher the water content in the raw material is, the lower the oil extraction rate is, the higher the phospholipid content in the krill oil is, and the lower the astaxanthin content in the krill oil is. That is, the water content in the krill meal and the ethanol concentration can influence the quality, the oil extraction rate and the content of effective substances of the krill oil, with the reduction of the ethanol concentration, the extraction rate is reduced and the phospholipid content is increased, but the astaxanthin content and transparency are reduced, and the viscosity is increased, and when the ethanol concentration is lower than 90%, the quality of the krill oil is poor, and the ethanol concentration is preferably 90%, 95% and 100%.

TABLE 2

Comparison of effects of solvents with different concentrations

| No. | Organic solvent | Oil extraction rate (%) | Phospholipid (g/100 g) | Astaxanthin (mg/kg) |
|---|---|---|---|---|
| 2-1 | Absolute ethyl alcohol | 22.87% | 35.71 | 292.17 |
| 2-2 | 99% ethanol | 21.12% | 38.09 | 267.80 |
| 2-3 | 98% ethanol | 19.90% | 44.29 | 204.04 |
| 2-4 | 97% ethanol | 16.87% | 46.25 | 186.86 |
| 2-5 | 96% ethanol | 15.96% | 49.96 | 175.50 |
| 2-6 | 95% ethanol | 14.59% | 59.48 | 139.11 |

TABLE 3

Influence of water content in krill meal on krill oil extraction

| Krill meal sample | Water content % | Fat content % | Oil extraction rate % | Phospholipid g/100 g | Astaxanthin mg/kg |
|---|---|---|---|---|---|
| 1# | 9.79 | 17.84 | 16.11 | 46.6 | 545.93 |
| 2# | 7.76 | 20.27 | 17.86 | 48.51 | 630.83 |
| 3# | 10.38 | 15.42 | 13.39 | 56.85 | 459.42 |
| 4# | 5.86 | 20.89 | 18.07 | 45.75 | 516.81 |
| 5# | 5.02 | 20.84 | 18.76 | 44.87 | 632.15 |

3. Comparison of Extraction Effects of Different Organic Solvent Concentrations, Concentrated Solution Concentrations and Water Addition Amounts Extraction is carried out by using Antarctic krill meal as a raw material according to the method in the step 1 except that a material-liquid ratio is 1:3, the extraction is carried out for three times, extraction of each time is carried out for 0.5 h at room temperature (20-30° C.), an organic solvent is an ethanol solution of different concentrations, the concentration of a concentrated solution is 10-15%, the water addition amount is 50-70% of the mass of the concentrated solution, and the extraction effects are compared, as shown in Table 4.

Results of numbers 3-2, 3-4 and 3-5 in Table 4 show that the higher the ethanol concentration is, the higher the oil extraction rate is, the lower the phospholipid content in the krill oil is, and the higher the astaxanthin content in the krill oil is; results of numbers 3-1 and 3-2 show that when the water addition amount is 70%, the oil extraction rate, the phospholipid content and the astaxanthin content are high; the results of numbers 3-1 and 3-3 show that when the concentration of the concentrated solution is 15%, both the oil extraction rate and the phospholipid content are high, and the astaxanthin content is low. By comprehensively considering the oil extraction rate and the phospholipid content and the astaxanthin content, preferably, the concentration of the concentrated solution is 15%, and the water addition amount is 70%. Specifically, according to actual production, the concentration of the organic solvent can be adjusted to 90-100%, the concentration of the concentrated solution can be adjusted to 10-15%, and the proportion of the added water is adjusted to 50-70%, so that Antarctic krill oil with the phospholipid content of 40-75% is obtained.

TABLE 4

Effect comparison of different organic solvent concentrations, concentrated solution concentrations and water addition amounts

| No. | Solvent | Concentrated solution concentration/% | Water addition amount/% | Oil extraction rate (%) | Phospholipid (g/100 g) | Astaxanthin (mg/kg) |
|---|---|---|---|---|---|---|
| 3-1 | Absolute | 15 | 50 | 10.58 | 47.30 | 198.19 |
| 3-2 | ethyl alcohol | 15 | 70 | 10.64 | 49.91 | 205.39 |
| 3-3 |  | 10 | 50 | 9.07 | 42.14 | 256.32 |
| 3-4 | 95% ethanol | 15 | 70 | 10.64 | 53.71 | 178.59 |
| 3-5 | 90% ethanol | 15 | 70 | 8.89 | 71.90 | 156.34 |

Example 2 Alkali Addition for Deacidification and Process Optimization

Extraction is carried out by using Antarctic krill meal as a raw material, according to the method in Example 1 except that water is replaced with alkaline water, an Antarctic krill extracting solution is concentrated until a solid content is 10-20%, alkaline water (in terms of water) with an amount of 0.5-0.9 times of the mass of the concentrated solution is added, and stirring is carried out for 1 h at 25-60° C. at 400-1000 rpm/min; after stirring, standing is performed until layering, a lower-layer oil phase is taken, and dissolved in absolute ethyl alcohol, and filtering is performed; and the filtrate is desolventized in vacuum to obtain refined Antarctic krill oil.

The alkaline water is prepared by dissolving sodium carbonate (soda ash) or sodium hydroxide (caustic soda) in deionized water; the actual addition amount of the caustic soda is 0.9-1.2 times of the theoretical addition amount of the caustic soda, and the actual addition amount of the soda ash is 0.5-1.5 times of the theoretical addition amount of the caustic soda.

A calculation formula of the theoretical addition amount of the caustic soda is $M_{NaOH} = M_{oil} \times AV \times 7.14 \times 10^{-4}$, wherein $M_{NaOH}$ is the theoretical addition amount (unit: kg) of the caustic soda, $M_{oil}$ is the mass (unit: kg) of the Antarctic krill crude oil, and AV is an acid value (unit: mgKOH/g oil) of the Antarctic krill crude oil.

1. Effect Comparison of Different Alkalis and Usage Amounts, and Different Alkali Treatment Temperatures By taking Antarctic krill meal as a raw material, an extracting solution is obtained according to the method adopted by the number 3-2 in Example 1, the extracting solution is concentrated until a solid content in a concentrated solution is 15%, different amounts and different types of alkaline water are added according to the method, and stirring is performed for 1 h at 25-60° C. at 400-1000 rpm/min; after stirring, standing is performed until layering, a lower-layer oil phase is taken, and dissolved in absolute ethyl alcohol, and filtering is performed; and the filtrate is desolventized in vacuum to obtain refined Antarctic krill oil. The results are shown in Table 5.

Results of 4-3, 4-4, 4-5 and 4-6 in Table 5 show that when the caustic soda is used in the alkaline water, the effect is optimal (the acid value is relatively low, and the yield, the phospholipid content and the astaxanthin content are not greatly changed) when the actual addition amount of the caustic soda is 1.1 times of the theoretical addition amount of the caustic soda, and results of 4-7, 4-8 and 4-9 show that the effect is optimal when the reaction temperature is 50° C. when the alkaline water is used, that is, a solution that the actual addition amount of the caustic soda is 1.1 times of the theoretical addition amount, and the reaction temperature is 50° C. when the alkaline water is used is optimal, and the result is as shown in 4-10.

Results of numbers 4-11, 4-12 and 4-13 in Table 5 show that when the soda ash is used in the alkaline water, the effect is optimal (the acid value is relatively low, and the yield, the phospholipid content and the astaxanthin content are not changed greatly) when the actual addition amount of the soda ash is 1.5 times of the theoretical addition amount of the caustic soda, and results of numbers 4-14, 4-15 and 4-16 show that the effect is optimal when the reaction temperature is 50° C. when the alkaline water is used, that is, a solution that the actual addition amount of the soda ash is 1.5 times of the theoretical addition amount of the caustic soda, and the reaction temperature is 50° C. when the alkaline water is used is optimal, and the result is as shown in the number 4-15.

TABLE 5

Effect comparison of different alkali usage amounts and different alkali treatment temperatures

| No. | Caustic soda usage amount (times) | Soda ash usage amount (times) | Temperature (° C.) | Yield (%) | Acid value (mg KOH/g) | Phospholipid (g/100 g) | Astaxanthin (mg/kg) |
|---|---|---|---|---|---|---|---|
| 4-1 Antarctic krill crude oil | / | / | / | 15.13 | 11.59 | 46.44 | 235.01 |
| 4-2 Control | 0 | / | 25 | 10.20 | 9.52 | 66.18 | 339.87 |
| 4-3 | 0.9 | / | 25 | 9.83 | 6.11 | 74.08 | 276.83 |
| 4-4 | 1.0 | / | 25 | 8.90 | 4.85 | 72.84 | 296.05 |
| 4-5 | 1.1 | / | 25 | 8.75 | 1.87 | 72.32 | 287.45 |
| 4-6 | 1.2 | / | 25 | 7.35 | 1.83 | 69.66 | 285.22 |
| 4-7 | 1 | / | 40 | 8.82 | 2.38 | 70.39 | 273.14 |
| 4-8 | 1 | / | 50 | 8.63 | 1.55 | 71.76 | 259.89 |
| 4-9 | 1 | / | 60 | 8.41 | 1.59 | 65.23 | 250.72 |
| 4-10 | 1.1 | / | 50 | 9.55 | 0.61 | 72.56 | 262.32 |
| 4-11 | / | 0.5 | 25 | 9.86 | 7.16 | 66.14 | 339.17 |
| 4-12 | / | 1.0 | 25 | 8.93 | 5.80 | 66.76 | 333.87 |
| 4-13 | / | 1.5 | 25 | 8.66 | 2.41 | 67.15 | 330.52 |
| 4-14 | / | 1.5 | 40 | 8.52 | 1.36 | 64.39 | 348.97 |
| 4-15 | / | 1.5 | 50 | 8.37 | 1.02 | 62.23 | 337.61 |
| 4-16 | / | 1.5 | 60 | 8.10 | 1.41 | 63.22 | 324.82 |

2. Direct Desolvation and Evaporation to Dryness of Crude Oil after Water/Alkaline Water Treatment Extraction is carried out by using Antarctic krill meal as a raw material according to the method adopted by the number 4-10 in the step 1 except that a material-liquid ratio is 1:3, the extraction is carried out for three times, extraction of each time is carried out for 0.5 h at room temperature (20-30° C.), an organic solvent is 95% ethanol, the concentration of a solid matter in a concentrated solution is 15%, the water addition amount is 70% of the mass of the concentrated solution, crude oil treated with water/alkaline water is directly desolventized and evaporated to dryness, sodium hydroxide is used as a solute of alkaline water, and the actual addition amount is 1.1 times of the theoretical alkali addition amount, and the results of the finally obtained krill oil are shown in Table 6.

The results in Table 6 show that compared with the addition of pure water, after the addition of the alkaline water, the acid value of the obtained krill oil is obviously reduced, the astaxanthin content is obviously increased, but the oil extraction rate and the phospholipid content are slightly reduced.

By comparing the results in Table 6 with the result in the number 4-10 in Table 5, it is found that the acid value of the crude oil after being directly desolventized and evaporated to dryness is the same as that of the crude oil after being dissolved in absolute ethyl alcohol, followed by filtering and desolventizing under reduced pressure, indicating that the acid value is not influenced by the process of dissolving the crude oil in absolute ethyl alcohol, filtering and desolventizing, but the content of astaxanthin in the krill oil can be increased, and the phospholipid content is slightly reduced.

TABLE 6

Direct desolvation and evaporation to dryness of crude oil after water/alkaline water treatment

| No. | Water addition type | Oil extraction rate (%) | Phospholipid (g/100 g) | Astaxanthin (mg/kg) | Acid value (mg KOH/g) |
|---|---|---|---|---|---|
| 5-1 | Pure water | 9.68 | 63.89 | 183.53 | 5.26 |
| 5-2 | Alkaline water | 7.87 | 61.34 | 198.94 | 0.61 |

In conclusion, the acid value of the krill oil can be effectively reduced through deacidification, and the storage stability of the krill oil is improved. During alkali addition for deacidification in Example 2, the alkali addition amount can be calculated through the formula, deacidification equipment does not need to be additionally arranged, the production investment is low, the deacidification effect is obvious, but the addition amount of the alkaline water (in terms of water) exceeds 1 times of the mass of the concentrated solution, which will reduce the transparency of the krill oil finished product, and reduce the yield.

The contents which are not described in detail in this specification belong to the prior art known to those skilled in the art. The above descriptions are merely examples of the present application, and are not intended to limit the present application. For those skilled in the art, various modifications and changes can be made in the present application. Any modification, equivalent replacement, improvement and the like made within the spirit and principle of the present application should be included within the scope of the claims of the present application.

What is claimed is:

1. A method for extracting a high-quality krill oil from krill, comprising the following steps:
S1, performing an extraction on the krill with an organic solvent, and collecting an extracting solution;
S2, adding alkaline water to the extracting solution to enable a free fatty acid to form a fatty acid salt to be separated from an oil phase, and performing an oil-water phase separation, and collecting the oil phase; wherein in the step, the reaction is carried out at 45-55° C., a solute in the alkaline water is an alkaline compound, the alkaline compound consisting of sodium carbonate or sodium hydroxide;
when the alkaline compound is sodium hydroxide, the actual addition amount of the sodium hydroxide is 0.9-1.2 times of the theoretical addition amount of the sodium hydroxide; and
when the alkaline compound is sodium carbonate, and the actual addition amount of the sodium carbonate is 0.5-1.5 times of the theoretical addition amount of the sodium hydroxide; and
the theoretical addition amount of the sodium hydroxide is $M_{NaOH}=M_{oil}\times AV\times 7.14\times 10^{-4}$, wherein $M_{NaOH}$ is the theoretical addition amount (unit: kg) of the caustic soda, $M_{oil}$ is a mass (unit: kg) of a krill oil in the extracting solution, and AV is an acid value (unit: mg KOH/g) of the krill oil in the extracting solution;
S3, purifying the oil phase to obtain the high-quality krill oil.

2. The method according to claim 1, wherein in step S1, the organic solvent is at least one selected from the group consisting of ethanol, acetone, n-hexane, diethyl ether, chloroform, and ethyl acetate; and
a concentration of the organic solvent is 80-100%.

3. The method according to claim 2, wherein in step S1, the organic solvent is ethanol, and the concentration of the organic solvent is 90-100%.

4. The method according to claim 1, wherein in step S1, during the extraction, a material-liquid ratio of the krill to the organic solvent is 1:(2-10);
an extraction mode is a soaking extraction or a counter current extraction;
the extraction is performed at 15-35° C.;
the extraction is performed for 1-5 times; and
the extraction of each time is performed for 0.3-12 h.

5. The method according to claim 4, wherein in step S1, during the extraction, the material-liquid ratio of the krill to the organic solvent is 1:(3-9);
the extraction mode is the counter current extraction;
the extraction is performed at 17-30° C.;
the extraction is performed for 2-3 times; and
the extraction of each time is performed for 0.5-7 h.

6. The method according to claim 1, wherein in step S2, before adding the alkaline water to the extracting solution, the method further comprises a step of concentrating the extracting solution.

7. The method according to claim 6, wherein a concentrating mode is a first reduced pressure distillation; and
a concentration of a solid matter in a concentrated extracting solution is 10-20%.

8. The method according to claim 7, wherein the first reduced pressure distillation is performed at 50-65° C.;
the first reduced pressure distillation is performed under a vacuum degree of −0.07 Mpa to −0.1 Mpa; and
the concentration of the solid matter in the concentrated extracting solution is 13-17%.

9. The method according to claim 1, wherein in step S2, a mass of the alkaline water added is 0.5-0.9 times of a mass of the extracting solution in terms of water.

10. The method according to claim 9, wherein in step S2, the mass of the alkaline water added is 0.6-0.8 times of the mass of the extracting solution in terms of water.

11. The method according to claim 1, wherein in step S3, the purifying comprises steps of dissolving the oil phase in absolute ethyl alcohol to obtain a resulting solution, filtering and desolventizing the resulting solution.

12. The method according to claim 11, wherein a desolventizing method is a second reduced pressure distillation.

13. The method according to claim 12, wherein the second reduced pressure distillation is performed at a temperature of 50-65° C. and a vacuum degree of −0.07 Mpa to −0.1 Mpa.

14. A high-quality krill oil prepared by the method according to claim 1, wherein a dosage form of the high-quality krill oil is a capsule, a microcapsule, a tablet, a paste, a powder, or an emulsion in water;
the high-quality krill oil comprises active phospholipids, choline and astaxanthin, the active phospholipids includes 2-20% of ether phospholipids and 25-55% of non-ether phospholipids, the choline is greater than or equal to 5%, the acid value of the krill oil is 0.61-1.02 mg KOH/g.

15. A method of using the high-quality krill oil according to claim 14 comprising preparing foods or medicines, wherein the foods comprise common foods, health foods, dietary supplements, and special medical foods.

* * * * *